(12) United States Patent
Albrecht et al.

(10) Patent No.: US 8,467,143 B2
(45) Date of Patent: Jun. 18, 2013

(54) SERVO PATTERNING AND WRITING COMPATIBLE WITH PLANARIZATION OF PATTERNED MAGNETIC DISKS

(75) Inventors: Thomas R. Albrecht, San Jose, CA (US); Kurt A. Rubin, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 0 days.

(21) Appl. No.: 12/699,501

(22) Filed: Feb. 3, 2010

(65) Prior Publication Data

US 2011/0188152 A1   Aug. 4, 2011

(51) Int. Cl.
G11B 21/02       (2006.01)
G11B 5/09        (2006.01)

(52) U.S. Cl.
USPC .............................................. 360/75; 360/48

(58) Field of Classification Search
None
See application file for complete search history.

(56) References Cited

U.S. PATENT DOCUMENTS

| | | | |
|---|---|---|---|
| 5,541,784 A * | 7/1996 | Cribbs et al. ................. | 360/75 |
| 5,766,718 A | 6/1998 | Matsuda et al. | |
| 6,088,200 A * | 7/2000 | Morita ........................ | 360/135 |
| 6,490,111 B1 * | 12/2002 | Sacks ........................... | 360/53 |
| 6,643,082 B1 | 11/2003 | Belser | |
| 6,680,079 B1 | 1/2004 | Stirniman | |
| 6,753,043 B1 | 6/2004 | Kuo et al. | |
| 6,821,627 B2 | 11/2004 | Stirniman et al. | |
| 7,262,932 B2 | 8/2007 | Asakura | |
| 7,417,826 B2 | 8/2008 | Hattori et al. | |
| 2005/0013971 A1 | 1/2005 | Nam | |
| 2006/0203386 A1 | 9/2006 | Soeno | |
| 2006/0269495 A1 | 11/2006 | Popp et al. | |
| 2006/0275692 A1 | 12/2006 | Okawa | |
| 2007/0031706 A1 | 2/2007 | Okawa | |
| 2007/0224339 A1 | 9/2007 | Kamata | |
| 2008/0170234 A1 | 7/2008 | Kim | |
| 2008/0171234 A1 | 7/2008 | Imamura | |
| 2008/0186616 A1 | 8/2008 | Matsuura | |
| 2008/0239906 A1 | 10/2008 | Akagi et al. | |
| 2011/0051286 A1 * | 3/2011 | Pokharel et al. ............. | 360/131 |

FOREIGN PATENT DOCUMENTS

JP          2006031853         2/2006

* cited by examiner

*Primary Examiner* — Andrew L Sniezek
(74) *Attorney, Agent, or Firm* — Duft Bornsen & Fettig, LLP

(57) ABSTRACT

Embodiments herein illustrate patterned servo data that is used to facilitate subsequent servo writing to a magnetic disk while allowing the patterned disk to be planarized with a relatively simple planarization process. One disk drive system includes a magnetic disk that is patterned with magnetic lands and nonmagnetic grooves. The magnetic disk also includes bootstrap bands that may be configured at an inner diameter of the magnetic disk. The magnetic lands of the bootstrap bands have varying sizes and are patterned as servo data having a uniform polarity of magnetization. The bootstrap bands have a width that is sufficiently narrow to support an air bearing surface of a slider. The data tracks are circumferentially configured proximate to the bootstrap bands. The slider reads the patterned servo data to facilitate writing of additional servo data in the data tracks.

29 Claims, 8 Drawing Sheets

SERVO PATTERNING AND WRITING COMPATIBLE WITH PLANARIZATION OF PATTERNED MAGNETIC DISKS

BACKGROUND

1. Field of the Invention

The invention relates to the field of disk drive systems and, in particular, to a magnetic disk having patterned servo regions that assist in aligning a slider with data on the magnetic disk.

2. Statement of the Problem

Many computing systems use magnetic disk drive systems for mass storage of information. Magnetic disk drive systems typically include one or more sliders that include read and write heads. An actuator/suspension arm holds the slider above a magnetic disk. When the magnetic disk rotates, an air flow generated by the rotation of the magnetic disk causes an air bearing surface (ABS) of the slider to fly at a particular height above the magnetic disk. The height at which the slider flies depends on the shape of the ABS. As the slider flies on the air bearing, a voice coil motor (VCM) moves the actuator/suspension arm to position the read head and the write head over selected tracks of the magnetic disk.

The magnetic disk includes data sectors and servo sectors. The servo sectors include servo data that is used to provide sector information, timing information, positioning information, etc. For example, the servo data may include a sector ID, a track ID, and a servo burst. The sector ID is a field in the servo sector that contains a binary code identifying the sector. Servo sectors are generally labeled sequentially around a track (e.g., from sector #1 to sector #250 if the track has 250 servo sectors). By reading the track ID, the read head can determine what track it is over. A servo burst is a field in the servo sector that contains a specially designed pattern, which, when read by the read head, provides information about the position of the read head relative to the center of a specific track. By reading the servo burst, the controller can determine how far from the center of the track that the read head is. These two pieces of information are used by the controller to determine where the read head, or more specifically the slider, is on the disk. By reading the sector ID, the controller determines which part of the revolution the read head is over.

Servo patterns include pattern elements that occupy a relatively large lateral spatial extent of the magnetic disk, both down track and cross track, as compared to the size of a data bit on the disk. For example, in a conventional magnetic disk, two magnetizations of polarization are used for recording the servo patterns. The servo headers generally have large areas of uniform magnetization of polarization. Each region may be much larger when compared to a single data bit on the disk.

Patterned magnetic disks have emerged recently to enhance the recording density by providing better track isolation or bit isolation. For example, nano scale nonmagnetic grooves may be patterned in a magnetic disk by removing the magnetic material leaving behind "lands" of magnetic material. By patterning grooves in the magnetic disk, tracks can be more clearly distinguished and thus made narrower to increase the areal density of data on the magnetic disk. Two forms of patterned magnetic disks exist: Discrete Track Media (DTM) and Bit Patterned Media (BPM). In BPM, individual bits may be patterned via cross grooves of nonmagnetic material (e.g., track grooves and crossing bit grooves that leave behind "islands" of magnetic material). In each of these, servo patterns may be generally created as part of the overall disk patterning process. In DTM, discrete tracks are patterned into the magnetic disk. One common approach to creating servo patterns is to pattern the magnetic material of the disk into bit lands such that a Direct Current (DC) magnetization (i.e., unipolar magnetization) of the entire disk may be used to create readable servo patterns via the signal contrast between the presence and absence of magnetic material.

When conventional servo patterns (e.g., servo burst patterns, sector ID patterns, cylinder ID patterns, synchronization and automatic gain control patterns, etc.) are created in this manner, many regions of nonmagnetic material have different shapes and sizes. This creates a significant challenge for planarization of the magnetic disk, which is important as it creates a reliable head-disk interface. The problem is that many of the available planarization methods have difficulty dealing with filling relatively large depressions in the disk that result from implementing the servo patterns. For example, certain planarization methods impose design rules on patterned media. For liquid-based planarization, all non magnetic grooves should be configured at or below a specified width that allows for the liquid to planarize the grooves through capillary forces. For dry planarization, such as vacuum deposit/etchback planarization, the ratio of magnetic land widths to non magnetic groove widths needs to be constant everywhere. It is also advantageous to ensure that magnetic land and non magnetic groove widths are constant everywhere. However, conventional servo patterns do not allow for this because of their widely varying shapes and sizes.

For patterned media, all of the servo patterns would preferably rely on DC magnetization during fabrication of the disk to provide usable servo signals for the life of the drive. Such would have the effect of not requiring additional servo writing, thereby saving time and money during the disk manufacturing process. Some methods of planarization (e.g., vacuum deposition and liquid polymer fill), however, are sensitive to the density and width of topographic features. For example, if a process is optimized to fill nonmagnetic grooves between patterned tracks in a data recording region of a DTM disk, the same process may produce unsatisfactory results on patterned servo data because the density and widths of the servo patterns can vary substantially from that of the DTM data tracks. A dip-coat/liquid spin-on process is particularly attractive from a cost and simplicity point of view; however, it often fails to fill features of servo patterns. One planarization process that may be used to avoid such limitations is chemical mechanical polishing (CMP); however, CMP is relatively expensive and difficult to implement, thereby adding to the overall cost of the produced magnetic disk. Accordingly, a need exists to create servo patterns to take advantage of the patterning of magnetic disks patterned while remaining compatible with planarization methods.

SUMMARY

Embodiments described herein provide for servo data that is compatible with various planarization methods to provide a reliable head disk interface. Servo patterns presented herein comply with the above mentioned design rules by providing a portion of the servo pattern features during the fabrication process. A simplified servo writing operation is thus used to create the complete servo patterns. In one embodiment, a bootstrap band even circumvents the design rules by patterning conventional servo patterns that are DC magnetized to a single polarity of magnetization. As long as this bootstrap band is sufficiently narrow, the slider flies over the non magnetic grooves even though they cannot be well planarized.

In one embodiment, the majority of non magnetic grooves are planarized using a liquid based planarization process (e.g., dip-coat/liquid spin-on). The magnetic disk may be patterned with bootstrap data in one or more relatively narrow bands that enable subsequent servo data writing in data tracks of the magnetic disk. Liquid based planarization can then leverage capillary forces to planarize the uniform narrow features that are within the data region (i.e., outside the bootstrap band). In the bootstrap band, the track ID, sector ID, and servo burst fields contain recessed regions (i.e., where the magnetic layer is etched away) of varying widths. A typical etch depth is about 10-40 nm, while widths of the bit patterns may be much larger. Thus, some of the etched depressions have a relatively low height-to-width aspect ratio.

As mentioned such depressions are generally problematic from a planarization point of view. Planarization may be accomplished through relatively simple dipping processes similar to present lube dipping processes, filling nonmagnetic grooves with a polymeric material. For example, grooves up to 46 nm deep and less than 30 nm wide may be planarized to within 3 nm of the magnetic surface after dipping. Ultra violet curing after dipping may then be used to lock the material in place such that it does not evaporate or succumb to air pressure and/or other factors. As stated, such planarization does not generally perform well with the patterned bootstrap servo data due to the greatly varying shapes and sizes of the nonmagnetic grooves. But, this data may be configured in bands that are narrow enough that the ABS of the slider overlaps surrounding data tracks of the magnetic disk.

In one embodiment, a disk drive system includes a controller, a magnetic disk patterned with magnetic lands and nonmagnetic grooves and a slider operable to read data from and write data to the patterned magnetic disk. The magnetic disk includes a bootstrap band configured at an inner diameter of the magnetic disk. The magnetic lands of the bootstrap band have varying sizes and are patterned as servo data having a uniform polarity of magnetization. A width of the band is sufficiently narrow to support an air bearing surface of the slider with a portion of the magnetic disk outside the band. The magnetic disk also includes a plurality of data tracks circumferentially configured proximate to the bootstrap band. The slider is operable to read the patterned servo data to generate a servo signal. The servo signal is processed by the controller to facilitate writing of additional servo data in the data tracks.

The magnetic disk may be planarized with a liquid based planarization method, such as a lubricant deposited upon the magnetic disk that is operable to planarize at least a portion of the magnetic disk by filling the nonmagnetic grooves. The nonmagnetic grooves outside the bootstrap band may include track grooves, bit grooves, or a combination thereof. The nonmagnetic grooves outside the bootstrap band may have a substantially uniform width. The nonmagnetic grooves of the bootstrap band may include track grooves and bit grooves. The controller may be operable to direct the slider to DC magnetize the bootstrap band to establish the uniform polarity of magnetization. Alternatively, the magnetic disk may be immersed in a strong DC magnetic field to magnetize the magnetic lands of the disk in a unipolar fashion. The controller may be operable to determine an eccentricity of the magnetic disk based on the patterned servo data and compensate for the eccentricity to controllably write the additional servo data to the data tracks. The controller may be operable to process the patterned servo data to identify a data track for writing the additional servo data.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
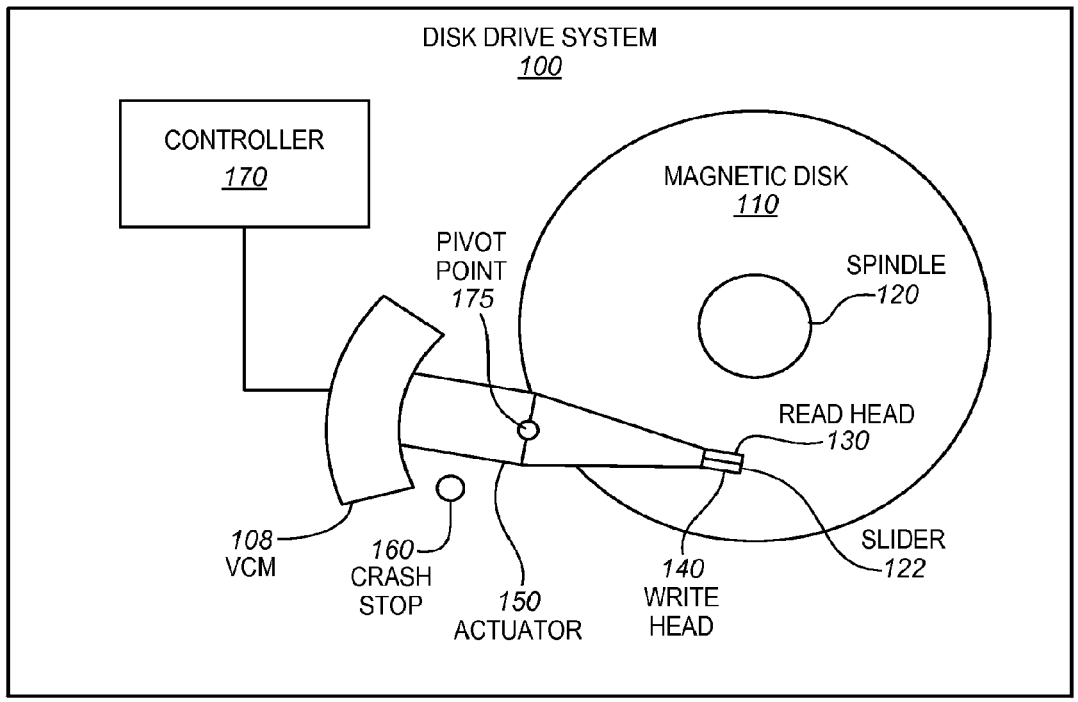
FIG. 1 illustrates a disk drive system in an exemplary embodiment.

FIG. 1 illustrates a simplified overhead view of a typical disk drive system 100, which is suitable to include a magnetic disk 110, as exemplarily described herein. In the disk drive system 100, a magnetic disk 110 is rotatably mounted upon a motorized spindle 120. A slider 122, having a read head 130 and a write head 140 fabricated thereon, is mounted upon an actuator 150 to "fly" above the surface of the rotating magnetic disk 110. In this regard, the disk drive system 100 may also include a controller 170 that is operable to apply a current to a voice coil motor (VCM) 108 to control the position of the actuator 150. The disk drive system 100 may also include an inner diameter crash stop 160 to hold the read head 130 and the write head 140 still at a fixed radius relative to the center of the magnetic disk 110. For example, the actuator 150 pivots about the pivot point 175 against the crash stop 160 to prevent the read head 130 and the write head 140 from traveling past a certain point at the inner diameter of the magnetic disk 110. The disk drive system 100 may include other components that are not shown for the sake of brevity. Additionally, certain components within the disk drive system 100 may be implemented as hardware, software, firmware, or various combinations thereof.

In conventional servo writing, a circular track pattern is created by pushing the actuator 150 of the disk drive system 100 against the crash stop 160 and then writing a single track pattern or a group of concentric track patterns at increasing radii. Once enough concentric tracks have been written, the read head 130 may sense previously written servo data and allow propagation of new servo tracks (e.g., both servo bursts and complete sector information) across the surface of the magnetic disk 110. That is, the read head 130 may be positioned over a servo pattern in the track while the write head 140 is positioned over tracks that have not yet been servo written.

Figure 2:
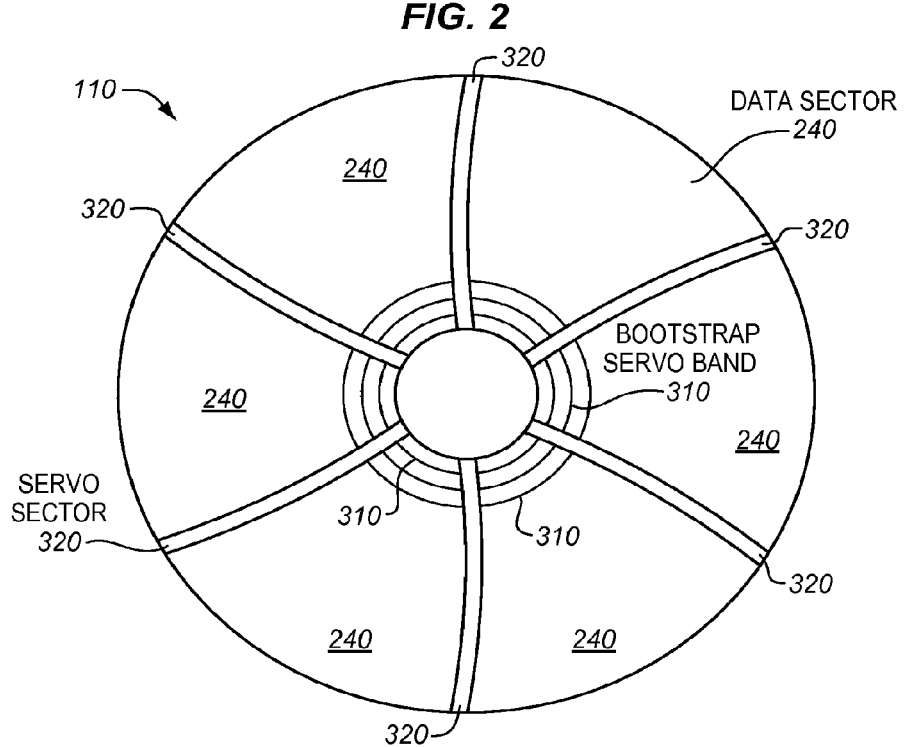
FIG. 2 illustrates a magnetic disk in an exemplary embodiment.

With the advent of patterned media, servo writing is presented with new challenges. For example, track trajectory is generally not concentric with the center of rotation of the spindle 120 because it is virtually impossible to concentrically align tracks with a spindle 120. Accordingly, the actual track trajectory is sensed and duplicated during the servo writing process. To do so, bootstrap servo data may be patterned in one or more relatively narrow bands 310 (e.g., 10-20 um wide) as exemplarily illustrated in FIG. 2 to utilize the advantages associated with patterned magnetic disks. For example, a bootstrap band 310 may be patterned with servo data within a crash stop compression region of the magnetic disk 110 where user data is not written. Each band 310 may be configured in such a way that the servo data appears as varying sized lands of magnetic material and varying sized grooves of nonmagnetic material. The magnetic lands may be immersed in a DC field to magnetize the magnetic lands in a unipolar fashion, establish a magnetic contrast between the magnetic lands and nonmagnetic grooves for facilitating servo data writing in the data tracks of the servo sectors 320 of the magnetic disk 110. Alternatively, the write head 140 may be configured to DC magnetize the magnetic lands. In any case, the bootstrap servo data in the bands 310 may facilitate the writing of subsequent servo data (e.g., track IDs, sector IDs, cylinder IDs, Automatic Gain Control or "AGC", etc.) in the servo sector 320 by compensating for eccentricity in the magnetic disk 110 and allowing the subsequent servo data to be written on a track by track basis. The track ID is a field in the servo sector that contains a binary code identifying the track (sometimes called the cylinder). As, mentioned, the sector ID is a field in the servo sector 320 that contains a binary code identifying the sector. Servo sectors are generally labeled sequentially around a track (e.g., from sector #1 to sector #250 if the track has 250 servo sectors). By reading the track ID, the read head 130 can determine what track it is over. As mentioned, a servo burst is a field in the servo sector 320 that contains a specially designed pattern, which, when read by the read head 130, provides information about the position of the read head 130 relative to the center of a specific track. Thus, by reading the servo burst, the controller 170 can determine how far from the center of the track that the read head 130 is. These two pieces of information are used by the controller 170 to determine where the read head 130, or more specifically the slider 122, is on the disk 110. By reading the sector ID, the controller 170 knows which part of the revolution the head 130 is over.

Although the nonmagnetic grooves of the bootstrap bands 310 of the magnetic disk 110 may not be thoroughly planarized after liquid dip/spin coat, each band 310 is sufficiently narrow so as to ensure that the slider 122 has a sufficient ABS on areas outside the bootstrap band 310. In other words, the slider 122 has a width that is wider than a band 310 of the bootstrap servo data. Thus, the slider 122 is supported with an air bearing between portions of the slider 122 above areas of the magnetic disk 110 outside the band 310 of servo data. Such prevents the slider 122 from crashing into the magnetic disk 110 (or at least controls fly height modulation/unstable flying) due to other portions of the magnetic disk 110 that stabilize the slider flying height. Thus, the sizes of the nonmagnetic grooves within the band 310 have little effect on the flying height of the slider 122. Generally, the position of the read head 130 on the slider is offset from the position of the write head 140, and this offset includes a component perpendicular to the tracks on the disk such that the read head 130 is positioned over a bootstrap band 310 while the write head 140 may be positioned over a track (i.e., outside the bootstrap band 310) so as to facilitate subsequent servo writing from the bootstrap band 310 outward.

The relative positions of the read and write heads 130/140 on the slider 122 are known and the procedures of measuring the "read/write offset" are also known. But, the position of the write head 140 cannot be directly measured (i.e., because it is not a sensor). Thus, the information pertaining to the read/write offset and the relative positions of the read and write heads 130/140, along with the known angle of the actuator 150, may be used to determine where the read head 130 needs to be in order to position the write head(s) 140 at a specific position for servo writing.

The signals generated from reading the patterned bootstrap servo data (i.e. via the read head 130) are used for starting a servo writing process. While the bootstrap pattern may be configured as an extension of the same type of servo patterns used in the servo sector 320, it may be better to use a different type of pattern in the bootstrap band 310. For example, since the area of the magnetic disk 110 where the bands 310 are patterned is not used for data, there is no need to minimize the size of the servo pattern in terms of areal efficiency. Then, the bootstrap bands 310 may be configured completely with servo pattern to provide for increased servo signal to noise ratio (SNR) and servo bandwidth. The increased SNR advantageously lowers the requisite amplitude from the read head 130. The nonmagnetic grooves between tracks in the remaining data sector 240 are filled to planarize the magnetic disk 110 and support the air bearing surface of the slider 122. The nonmagnetic grooves of the bands 310 may not be as planarized as the data sector 240. However, this is of little consequence as the width of the band 310 is sufficiently narrow so that data tracks outside the bands 310 provide the necessary support for the slider 122. Examples of various servo patterns are shown are described in greater detail below in FIGS. 3-7.

Figure 3:
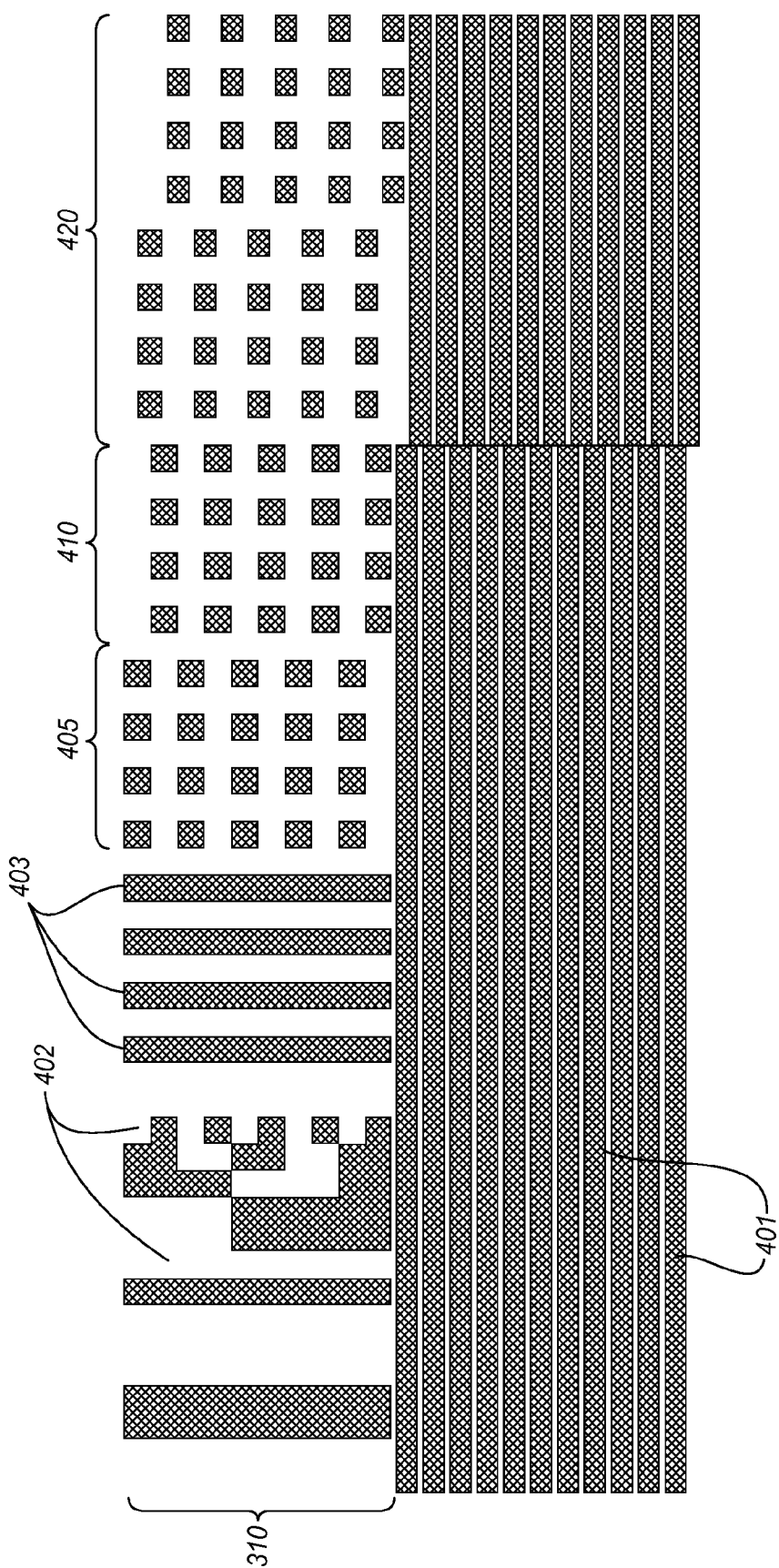
FIGS. 3-7 illustrate servo patterns of the magnetic disk in exemplary embodiments.

FIG. 3 illustrates one exemplary bootstrap band 310 that may be configured as a pattern of varying size magnetic lands 403 and nonmagnetic grooves 402. In this embodiment, the bootstrap band 310 is formed within the inner diameter of the magnetic disk 110 proximate to a plurality of data tracks 401 where data and subsequently written servo data may be stored. The bootstrap servo data is formed from a single polarization of magnetization where the shape of the magnetic lands 403 defines the data bits of the bootstrap servo data. For example, the pattern 405 may represent a data stream of 1010101 based on the single polarization of magnetization in the magnetic lands 403 within the pattern 405. That is, the shape of the magnetic land dictates the data because they are uniformly polarized. In this regard, the magnetic disk 110 may be uniformly magnetized because the bootstrap servo data is configured from the structural patterning of the magnetic lands 403 and the nonmagnetic grooves 402 within the bootstrap band 310. The slider 122 may be positioned such that the read head 130 passes over the bootstrap band 310 to read the bootstrap pattern of the magnetic lands 403 and nonmagnetic grooves 402.

Figure 4:
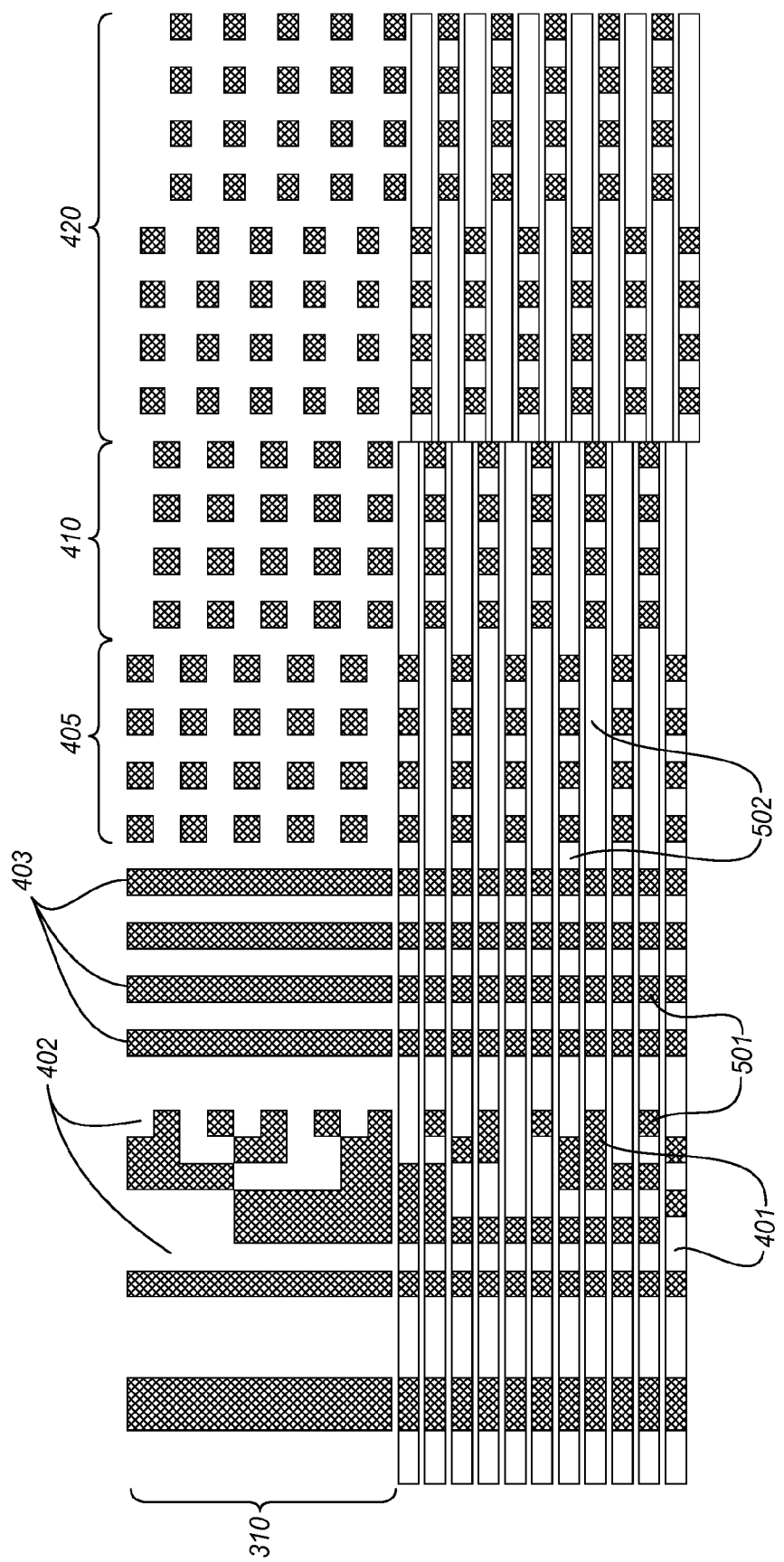

Upon reading the bootstrap servo data in the bootstrap band 310, the disk drive system 100 may initiate writing servo data within the data tracks 401. For example, in FIG. 3, the read head 130 may read the patterned servo data in the bootstrap band 310. The patterned servo data may, in turn, direct the disk drive system 100 to write standard servo data in the data tracks 401 at the servo sector 320. In doing so, the disk drive system 100 may magnetically write the servo data to individual data tracks 401. That is, the disk drive system 100 may write individual bits of servo data in each data track 401 as either one polarization of magnetization 501 or one of opposite polarity 502, as shown in FIG. 4. Additionally illustrated in FIGS. 3 and 4 is a region of bits 420 that is shifted by ½ track to assist in the creation of a conventional quad burst servo pattern. To the right of the region 410, the tracks return to their normal position (i.e., they are no longer shifted by a half track).

For the initial bootstrap servo patterns, tolerance considerations can generally affect the choice of layout. The position of the read/write heads 130/140 when the actuator 150 touches the crash stop 160 generally has a wide tolerance (e.g., hundreds of μm), due to the fact that the crash stop 160 is configured from an elastomeric material that cushions the actuator 150. If the position of the read/write heads 130/140 at the crash stop 160 could be precisely determined, a single band of bootstrap patterns centered on the head radius could be created with a radial width just wide enough to cover the maximum expected runout of the tracks (e.g., due to magnetic disk eccentricity, etc.). Since the position generally cannot be precisely determined, one option includes configuring the patterned servo data wide enough to accommodate the full tolerance range plus the eccentricity (e.g., hundreds of μm wide). However, if the bootstrap band 310 is made too wide, the air bearing surface (ABS) of the slider 122 may no longer be supported by adequately wide regions outside of the bootstrap band 310, creating risk of unstable flying or head crash.

Since the crash stop 160 is compressible, controlled compression of the actuator 150 against the crash stop 160 is possible. The spacing of the narrow bootstrap bands 310 (e.g., "crash stop tolerance zone") is relatively small so that the actuator 150 may be capable of moving far enough to reach at least one of the bootstrap bands 310. In other words, the spacing between each of the bootstrap bands 310 generally does not exceed the radial distance that the read/write heads 130/140 can be moved by compressing the crash stop 160 in a controlled fashion. This enables the disk drive system 100 to find a bootstrap band 310 and initiate the servo writing process from there. If additional bootstrap bands 310 exist outside the one which initiates self servo writing, the disk drive system 100 may approach the additional bootstrap bands 310 in a controlled fashion by continuing servo writing through the additional bootstrap bands 310. The presence of multiple bootstrap bands 310 avoids crash risk because the width of a particular bootstrap band 310 is relatively small compared to the spacing between the bootstrap bands 310.

Figure 5:
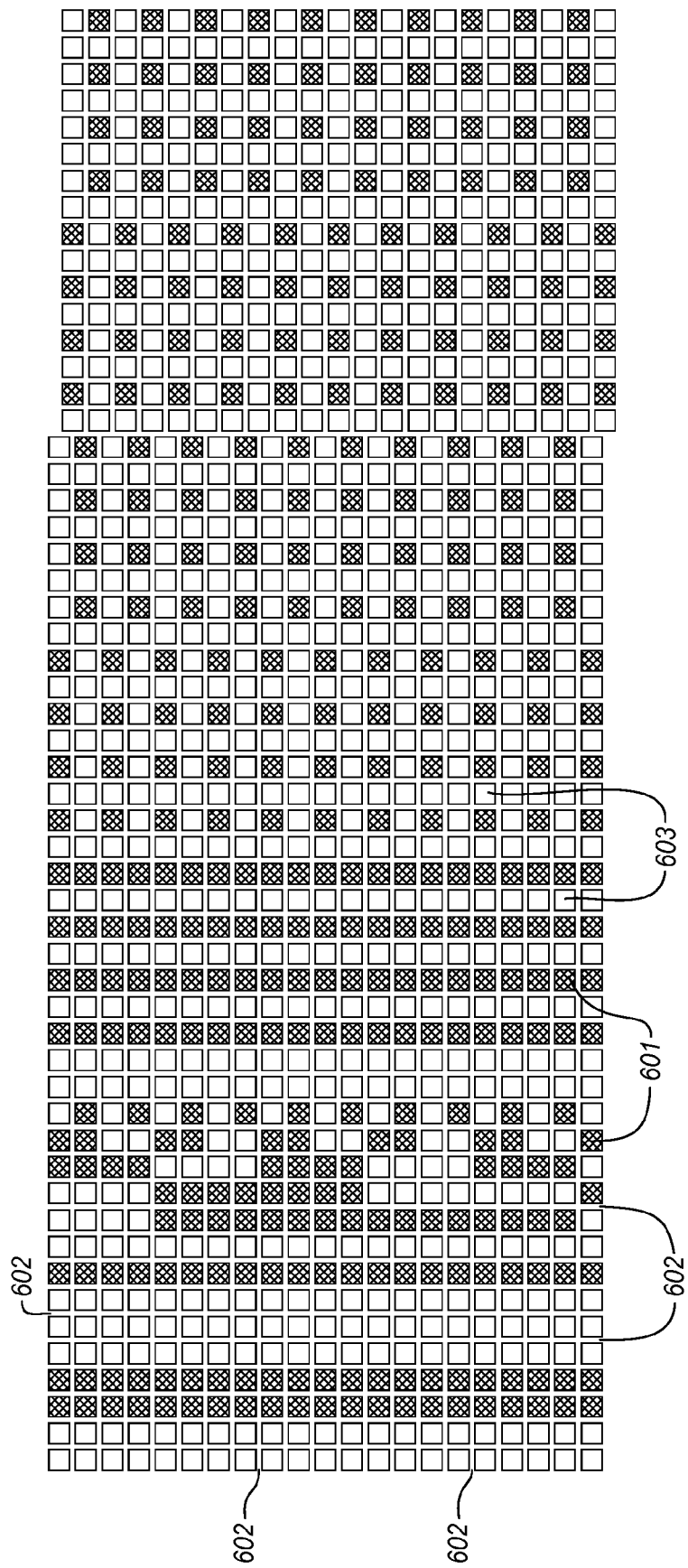
Figure 6:
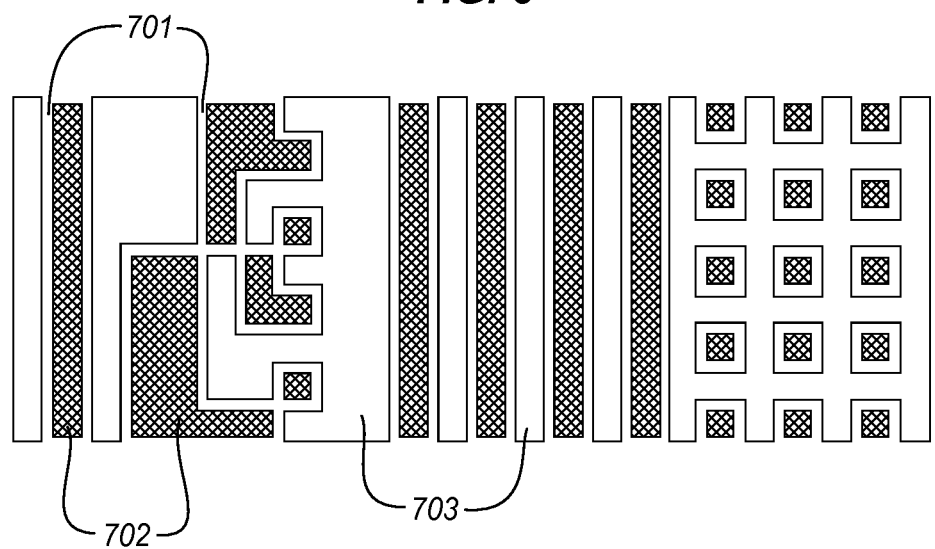
Figure 7:
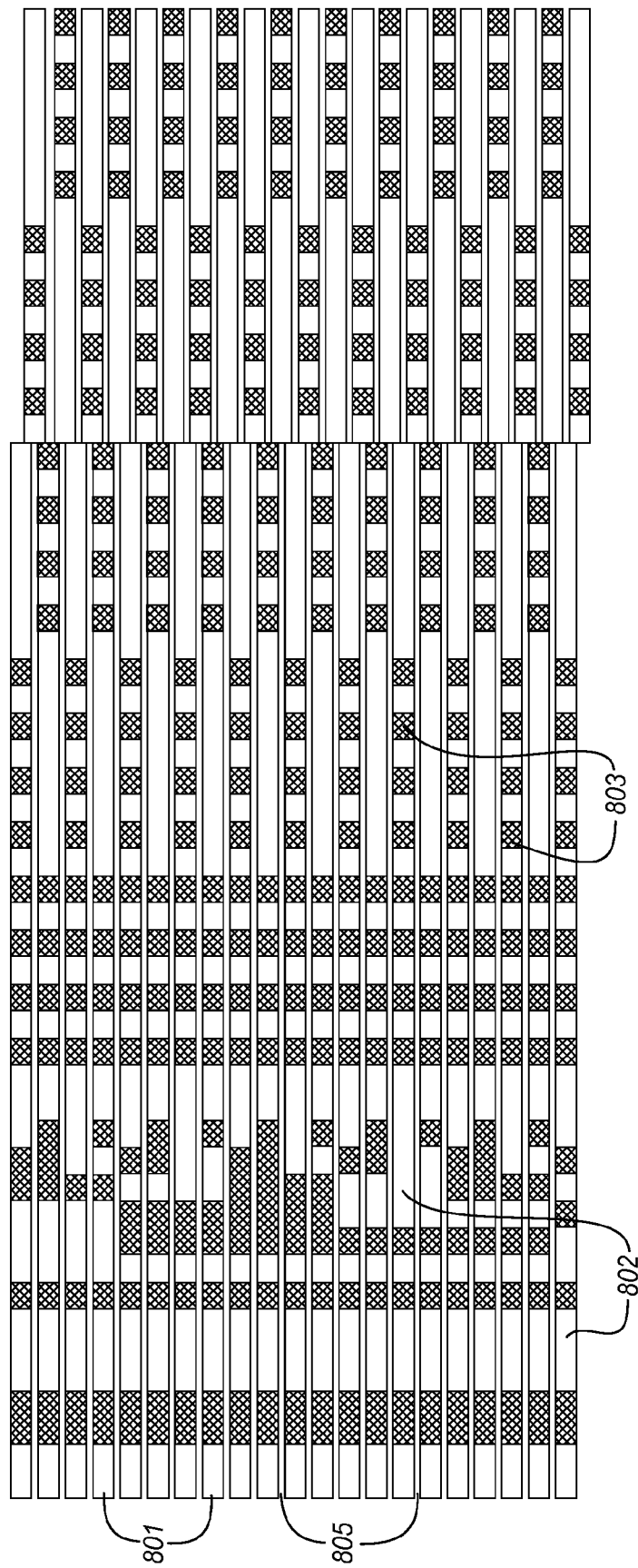

Although shown and described with respect to one polarity of magnetization of a bootstrap servo pattern, the invention is not intended to be so limited. Rather, the servo data may be configured/patterned in other ways. For example, FIGS. 5-7 illustrate various servo patterns that may be configured in the data region of the magnetic disk 110 outside the bootstrap band 310 (i.e., in the servo sector 320). FIG. 5 illustrates how the servo data may be written/patterned in a BPM magnetic disk. For example, the magnetic disk 110 may be patterned in a BPM manner such that the magnetic disk 110 consists of equal sized cells 601/603 of magnetic lands separated by nonmagnetic grooves 602 of uniform width. The servo data may be configured with the cells 601/603 in such a way that one polarization of magnetization represents a logical 1 (e.g., cells 601) and the opposite polarization of magnetization represents a logical 0 (e.g., cells 603). In FIG. 6, another exemplary manner in which servo data may be written/patterned in the magnetic disk 110 is presented. In this embodiment, the servo data is patterned in the magnetic disk 110 with the nonmagnetic grooves 701 operably separating the two polarizations of magnetization 702 and 703. The servo data patterns of FIGS. 5-7 may have the effect of ensuring that the slider 122 has an air bearing between the slider 122 and the magnetic disk 110 after being planarized with a lubricant. For example, the uniform width of the nonmagnetic grooves 602 and 701 may allow the nonmagnetic grooves to be filled with the lubricant to ensure that the slider 122 flies above the magnetic disk 110 at a substantially uniform height. In another embodiment, the servo data may be written in a DTM format, as illustrated in FIG. 7. For example, individual bits 802/803 of opposite magnetization are not separated by nonmagnetic grooves; rather, the tracks 801 are. The write head 140 may write the servo data as bits of opposite polarizations of magnetization (e.g., bits 802 representing a logical zero and bits 803 representing a logical 1) in the patterned tracks 801 of the magnetic disk 110. As with the other embodiments, the nonmagnetic grooves 805 are configured with uniform widths that may be filled with a lubricant to planarize the magnetic disk 110 to assist in this fashion. An advantage of the pattern in FIG. 7 includes the downtrack boundaries between regions of opposite magnetization, which may allow more precise boundaries and, therefore, a more precise/noise-free position error signal (PES) than achieved by conventional servo writing alone.

As mentioned, the patterns illustrated in FIGS. 5-7 are suitable for liquid planarization, since all groove widths are uniform outside the bootstrap band 310. Additionally, the patterns illustrated in FIGS. 5 and 7 are compatible with the design rules for dry planarization, which generally requires a uniform land to groove ratio and preferably uniform land and groove widths. The pattern illustrated in FIG. 6, however, is generally not suitable for dry planarization, since the lands have varying widths.

Figure 8:
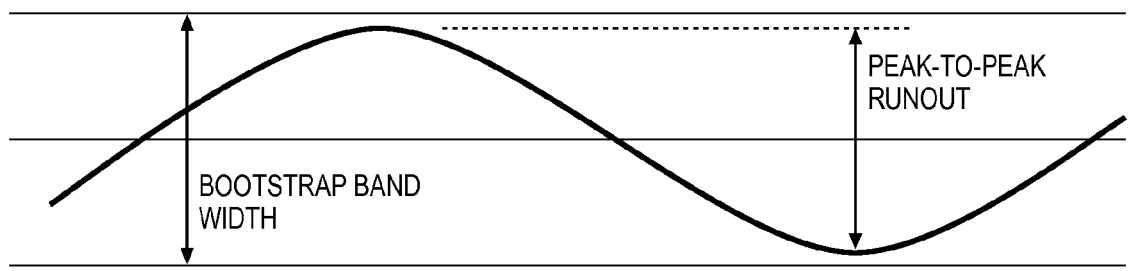
FIGS. 8 and 9 illustrate alignment and correction of read and write heads within a bootstrap servo band in an exemplary embodiment.
Figure 9:
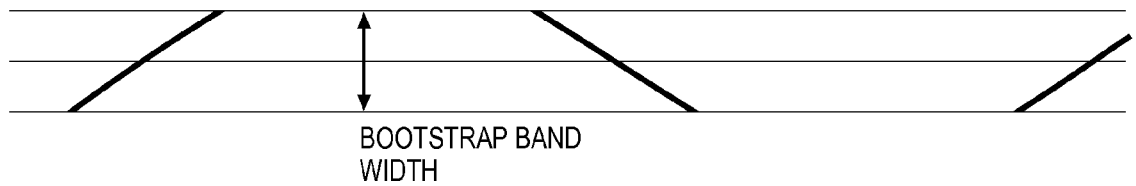

Eccentricity of a track of the magnetic disk 110 may appear as illustrated in FIG. 8. This eccentricity is exemplarily illustrated as a sinusoidal trajectory of the slider 122 relative to the bootstrap band 310. By determining this trajectory at each servo sector, compensation may then be applied by a feed forward means so that the read/write heads 130/140 follow the non concentric path. It is generally not necessary to have the bootstrap band 310 wide enough to accommodate worst case eccentricity. Rather, as long as the bootstrap band 310 is wide enough to capture some portion of the slider 122 trajectory through the bootstrap band 310, the eccentricity can be calculated and compensated for. For example, in FIG. 9, less information is available because the trajectory of the read/write heads 130/140 takes the slider 122 out of the bootstrap band 310. However, sufficient information is available to provide coarse compensation of the eccentricity. Applying such coarse compensation is sufficient to bring the trajectory of the read/write heads 130/140 entirely within the bootstrap band 310, so that a more precise determination of the eccentricity can be made, and a sufficiently precise compensation can be applied to allow the start of the servo writing process.

Figure 10:
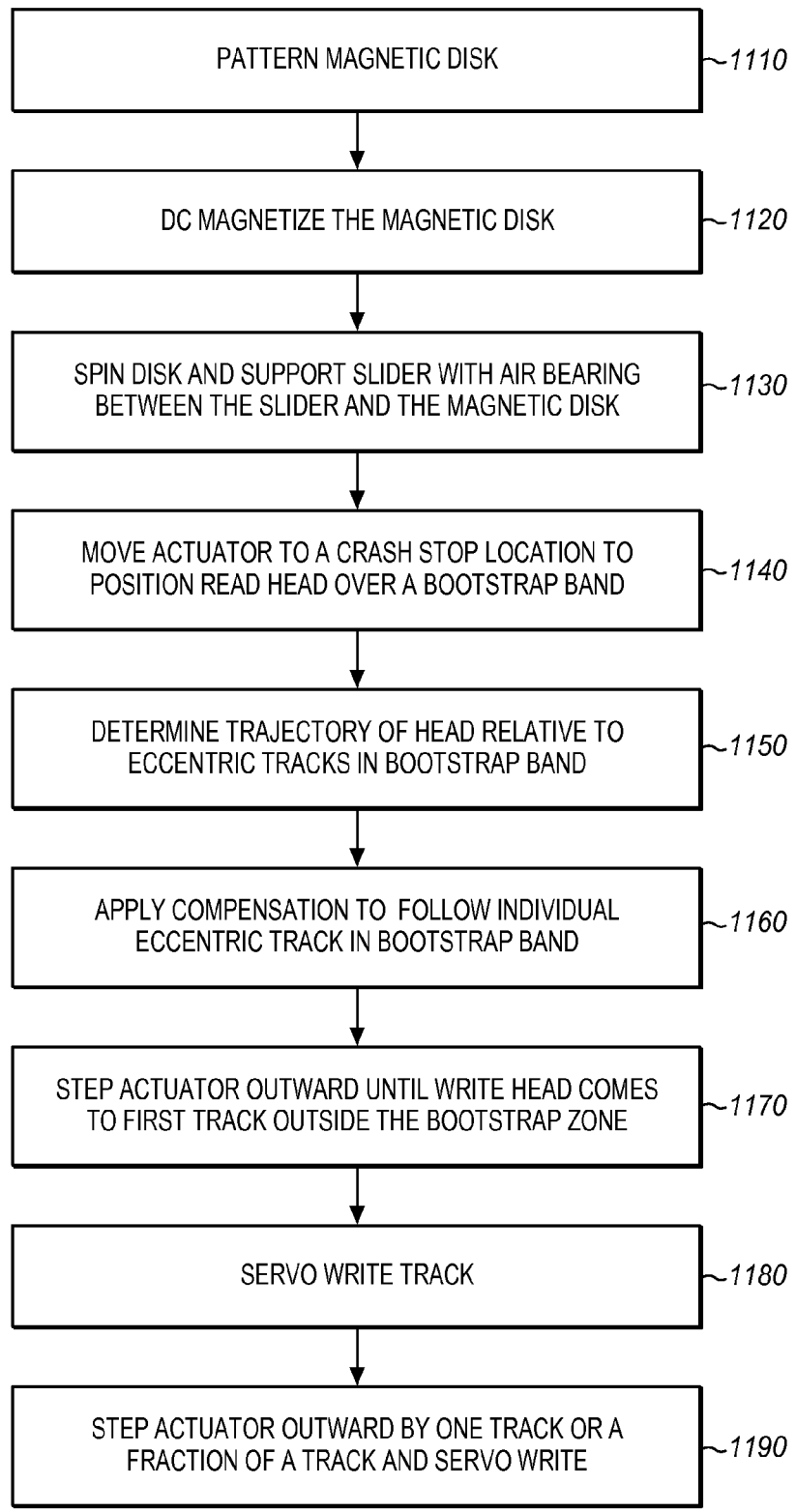
FIG. 10 is a flow chart illustrating a method for writing servo data on a magnetic disk in an exemplary embodiment.

FIG. 10 is a flow chart 1100 illustrating a method for writing servo information on a magnetic disk 110 in an exemplary embodiment. In this embodiment, the magnetic disk 110 is patterned with nonmagnetic grooves and magnetic lands, in the process element 1110. In the bootstrap band 310, bootstrap servo data is patterned with varying sized nonmagnetic grooves and magnetic lands. The magnetic disk 110 is DC magnetized to establish a uniform polarity of magnetization, in the process element 1120. The disk drive system 100 spins the magnetic disk 110 to form an air bearing between the slider 122 and the magnetic disk 110, in the process element 1130. The disk drive system 100 positions the actuator 150 against the crash stop 160 such that the slider 122 may be positioned over the bootstrap band 310 (e.g., in the compressible crash stop region) of the magnetic disk 110, in the process element 1140. The patterned servo data is used to facilitate the writing of additional servo data in the data tracks of the magnetic disk 110, as described hereinabove. Since this bootstrap band 310 of servo data may be substantially narrower than the overall width of the slider 122, the slider 122 resides over some planarized portion of the magnetic disk 110. That is, some of the grooves of the bootstrap band 310 may not be thoroughly planarized. Such would typically cause problems with the fly height of the heads. However, as the magnetic disk 110 spins, an air bearing is formed between the slider 122 and the portion of the magnetic disk 110 outside the bootstrap bands 310 that supports the slider 122. From there, the disk drive system 100 reads the patterned servo data from the bootstrap band 310 via the read head 130, in the process element 1150, to initiate servo writing in the data tracks of the magnetic disk 110. In doing so, the controller 170 determines the trajectory of the read/write heads 130/140 relative to the eccentric tracks in the bootstrap band 310, in the process element 1150. The controller 170 may apply compensation such that the read/write heads 130/140 follow an individual eccentric track in the bootstrap band 310, in the process element 1160. The controller 170 directs the actuator 150 to step outward until the write head 140 comes to a first track outside the bootstrap band 310, in the process element 1170. The controller 170 writes servo data in that track in the servo sectors 320. Thus, the bootstrap servo data that is patterned within the bootstrap band 310 may be used by the controller 170 to facilitate the writing of additional servo data within the data tracks of the magnetic disk 110. The controller 170 steps the actuator 150 outward by one track or a fraction thereof to continue writing servo data in the servo sectors 320, in the process element 1190.

Although specific embodiments were described herein, the scope of the invention is not limited to those specific embodiments. The scope of the invention is defined by the following claims and any equivalents thereof.

We claim:
1. A disk drive system, comprising:
a controller;
a magnetic disk patterned with magnetic lands and nonmagnetic grooves; and
a slider operable to read data from and write data to the patterned magnetic disk;
wherein the magnetic disk comprises:
a bootstrap band, wherein the magnetic lands of the bootstrap band have varying sizes and are patterned as servo data having a uniform polarity of magnetization, wherein a width of the band is sufficiently narrow to support an air bearing surface of the slider with a portion of the magnetic disk outside the band; and
a plurality of data tracks circumferentially configured proximate to the bootstrap band, wherein the slider is operable to read the patterned servo data to generate a servo signal, wherein the servo signal is processed by the controller to facilitate writing of additional servo data in the data tracks.
2. The disk drive system of claim 1, wherein the magnetic disk is planarized with a liquid based planarization method.
3. The disk drive system of claim 2, further comprising a lubricant deposited upon the magnetic disk via the liquid based planarization method, wherein the lubricant is operable to planarize at least a portion of the magnetic disk by filling the nonmagnetic grooves.
4. The disk drive system of claim 1, wherein the nonmagnetic grooves outside the bootstrap band are track grooves, bit grooves, or a combination thereof.
5. The disk drive system of claim 1, wherein the nonmagnetic grooves outside the bootstrap band have a substantially uniform width.
6. The disk drive system of claim 1, wherein the nonmagnetic grooves outside the bootstrap band have a width less than about 50 nm.
7. The disk drive system of claim 1, wherein the controller is operable to direct the slider to direct-current (DC) magnetize the bootstrap band to establish the uniform polarity of magnetization.
8. The disk drive system of claim 1, wherein the controller is operable to determine an eccentricity of the magnetic disk based on the patterned servo data and compensate for the eccentricity to controllably write the additional servo data to the data tracks.
9. The disk drive system of claim 1, wherein the bootstrap band is configured at an inner diameter of the magnetic disk.
10. The disk drive system of claim 1, wherein a ratio of the magnetic lands to the nonmagnetic grooves is constant across areas of the magnetic disk outside the bootstrap band.
11. The disk drive system of claim 1, wherein the magnetic lands outside the bootstrap band have a first substantially uniform width and the nonmagnetic grooves outside the bootstrap band have a second substantially uniform width.
12. The disk drive system of claim 1, wherein first and second substantially uniform widths are different.
13. The disk drive system of claim 1, wherein the magnetic disk is planarized with a dry planarization method, wherein the nonmagnetic grooves are filled with a material that solidifies.
14. The disk drive system of claim 1, further comprising a plurality of servo sectors configured in the data tracks, wherein the servo sectors comprise a region of servo data patterned with nonmagnetic grooves radially offset by a portion of a data track with respect to other nonmagnetic grooves.
15. A method of writing servo data on a magnetic disk, wherein the magnetic disk is configured within a disk drive system having an actuator and a slider, wherein the slider comprises a read head and a write head, wherein the magnetic disk comprises one or more bootstrap bands, wherein the bootstrap bands are physically patterned with magnetic lands having varying sizes and nonmagnetic grooves to form patterned servo data at an inner diameter of the magnetic disk proximate to a crash stop location of the actuator, wherein the magnetic lands have a uniform polarity of magnetization, and wherein a width of the bootstrap band is sufficiently narrow to support an air bearing surface of the slider with a portion of the magnetic disk outside the band, the method comprising:
rotating the magnetic disk to form an air bearing between the slider and the magnetic disk;
moving the actuator to the crash stop location to position the read head over the patterned servo data;
reading the patterned servo data via the read head to initiate servo writing to the magnetic disk;
moving the actuator based on the patterned servo data to position the write head over data tracks of the magnetic disk; and
writing the additional servo data in the data tracks via the write head.
16. The method of claim 15, further comprising direct-current ("DC") magnetizing the bootstrap band to establish the uniform polarization of magnetization.
17. The method of claim 15, further comprising:
determining an eccentricity of the magnetic disk based on the patterned servo data; and
compensating for the eccentricity to controllably write the additional servo data in the data tracks.

18. The method of claim 15, wherein the magnetic lands outside the bootstrap bands are substantially uniform.

19. The method of claim 15, wherein the nonmagnetic grooves outside the bootstrap bands are substantially uniform.

20. The method of claim 15, wherein the nonmagnetic grooves outside the bootstrap band have a width less than about 50 nm.

21. The method of claim 15, wherein the magnetic disk further comprises a plurality of servo sectors configured in the data tracks, wherein the servo sectors comprise a region of servo data patterned with nonmagnetic grooves radially offset by a portion of a data track with respect to other nonmagnetic grooves.

22. A magnetic disk patterned with magnetic lands and nonmagnetic grooves, the magnetic disk comprising:
   a plurality of bootstrap bands configured at an inner diameter of the magnetic disk, wherein the magnetic lands of the bootstrap bands have varying sizes and are configured as patterned servo data having a uniform polarity of magnetization, wherein a width of the bands is sufficiently narrow to support an air bearing surface of the slider with a portion of the magnetic disk outside the band; and
   a plurality of data tracks circumferentially configured proximate to the bootstrap bands, wherein the patterned servo data identifies the data tracks for writing additional servo data.

23. The magnetic disk of claim 22, wherein the magnetic disk is planarized with a liquid based planarization method.

24. The magnetic disk of claim 23, further comprising a lubricant deposited upon the magnetic disk via the liquid based planarization method, wherein the lubricant is operable to planarize at least a portion of the magnetic disk by filling the nonmagnetic grooves.

25. The magnetic disk of claim 22, wherein the nonmagnetic grooves outside the bootstrap bands are track grooves, bit grooves, or a combination thereof.

26. The magnetic disk of claim 22, wherein the nonmagnetic grooves outside the bootstrap bands have a substantially uniform width.

27. The magnetic disk of claim 22, wherein the nonmagnetic grooves of the bootstrap bands include track grooves and bit grooves.

28. The magnetic disk of claim 22, further comprising a plurality of servo sectors configured in the data tracks, wherein the servo sectors comprise a region of servo data patterned with nonmagnetic grooves radially offset by a portion of a data track with respect to other nonmagnetic grooves.

29. A method, comprising:
   patterning a magnetic disk with a plurality of magnetic lands and nonmagnetic grooves, wherein a portion of the magnetic lands and nonmagnetic grooves vary in size and are configured in bootstrap bands at an inner diameter of the magnetic disk;
   establishing a uniform polarity with the magnetic lands in the bootstrap bands to form patterned servo data;
   rotating the magnetic disk to form an air bearing between a slider and a portion of the magnetic disk outside the bootstrap bands;
   moving an actuator to a crash stop location to position a read head over the patterned servo data;
   reading the patterned servo data from the bootstrap bands to initiate servo writing to the magnetic disk;
   moving the actuator based on the patterned servo data to position the slider over data tracks of the magnetic disk that are circumferentially configured proximate to the bootstrap bands; and
   writing the additional servo data to the data tracks.

* * * * *

UNITED STATES PATENT AND TRADEMARK OFFICE
CERTIFICATE OF CORRECTION

| | | |
|---|---|---|
| PATENT NO. | : 8,467,143 B2 | Page 1 of 1 |
| APPLICATION NO. | : 12/699501 | |
| DATED | : June 18, 2013 | |
| INVENTOR(S) | : Albrecht et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this
Fourth Day of March, 2014

Michelle K. Lee
*Deputy Director of the United States Patent and Trademark Office*